A. W. HAM.
TROLLEY MECHANISM.
APPLICATION FILED MAR. 30, 1920.
1,358,440.
Patented Nov. 9, 1920.
2 SHEETS—SHEET 1.
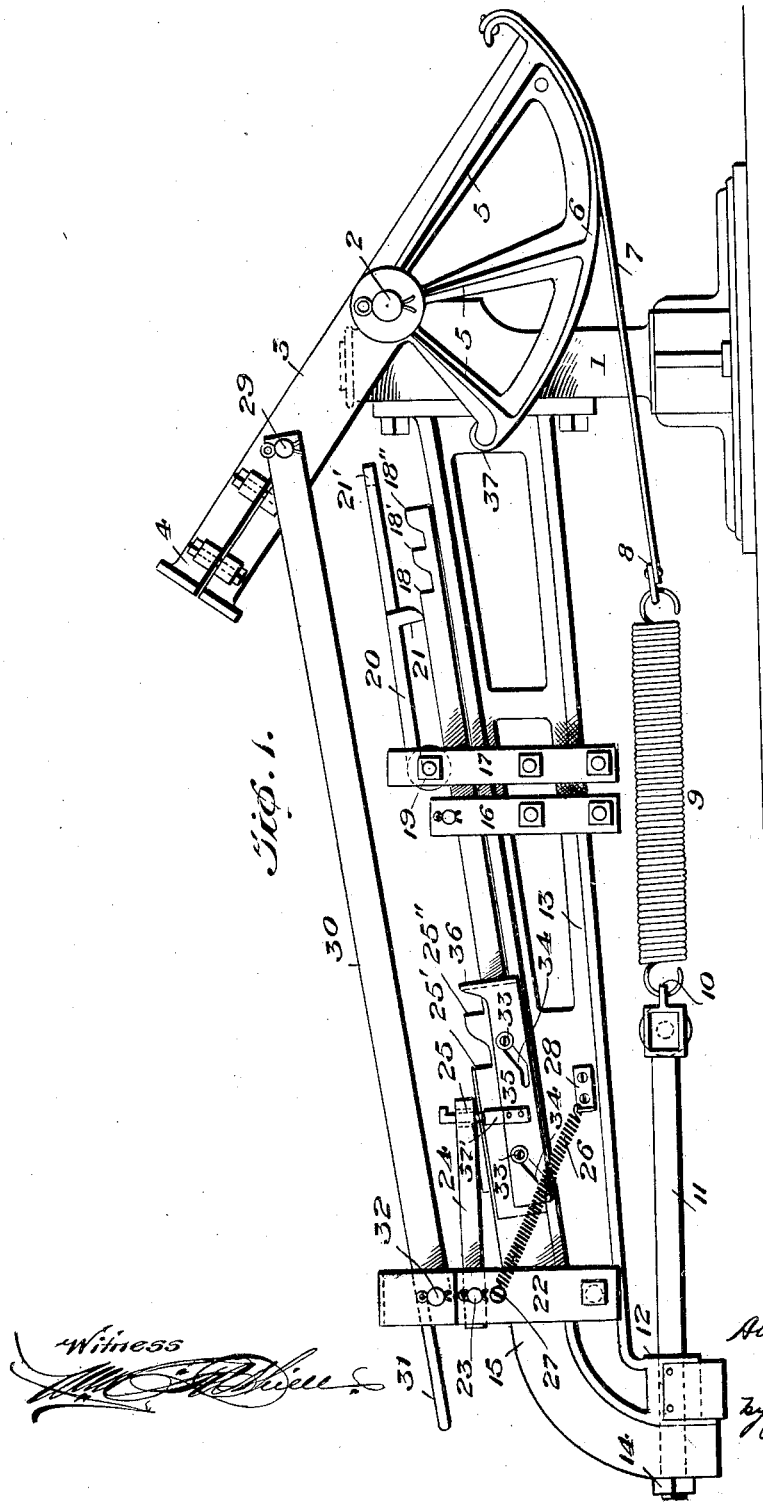
INVENTOR.
Albert W. Ham
by Jas. L. Skidmore
his ATTORNEY.

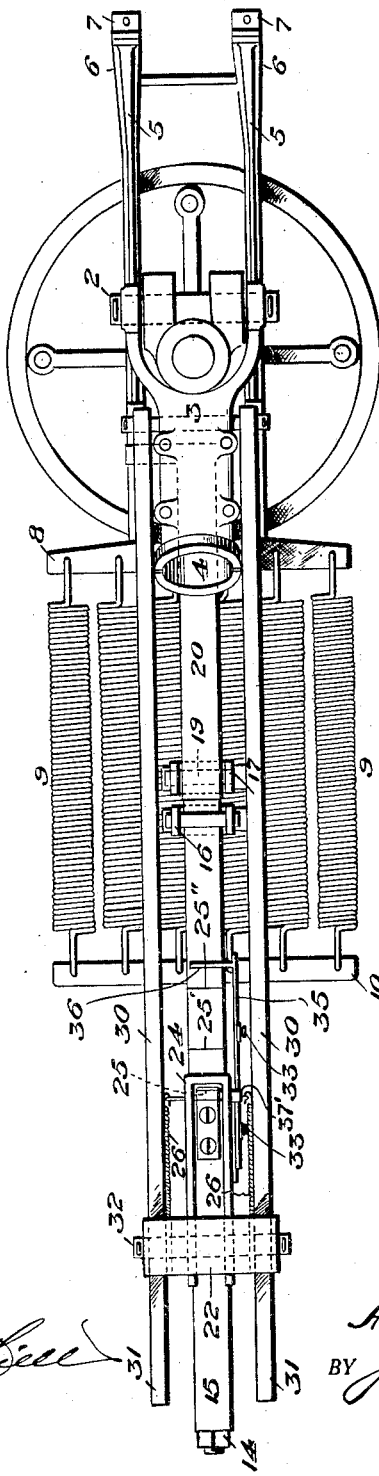

UNITED STATES PATENT OFFICE.

ALBERT W. HAM, OF TROY, NEW YORK.

TROLLEY MECHANISM.

1,358,440.  Specification of Letters Patent.  Patented Nov. 9, 1920.

Application filed March 30, 1920. Serial No. 369,936.

*To all whom it may concern:*

Be it known that I, ALBERT W. HAM, a citizen of the United States, residing at Troy, in the county of Rensselaer and State of New York, have invented certain new and useful Improvements in Trolley Mechanism, of which the following is a specification.

My invention relates to trolley mechanism, and is provided with means especially designed to prevent damage to overhead construction.

The main object of this invention is to provide simple, durable and thoroughly efficient means, connected with the base and trolley pole for effectively controlling the overhead trolley so as to prevent its entanglement with the cross-wires and thereby damaging the same when the trolley is caused to accidentally escape from the trolley wire.

Another object is to construct an attachment of a novel character which may be readily secured to any of the well known trolley bases, and adapted to withstand the required conditions of service.

Another object of the invention is to provide novel self-releasing trolley-retaining mechanism in which the escape of the trolley wheel from the trolley wire will automatically release the tension of the retaining springs and allows the trolley pole to drop down out of the path of the overhead suspension devices.

A further object of this invention is to so construct my improved mechanism as to insure proper pressure of the trolley against the trolley wire at all times, and to fully reset and restore the required tension to the retaining springs after said tension shall have been released.

The foregoing and such other objects as may appear from the ensuing description are attained by the novel features of construction, arrangement, location and combination of parts hereinafter more fully described, illustrated in the accompanying drawings, and particularly pointed out in the claims appended hereto, it being understood that slight changes in the precise form, proportions, and minor details of the construction may be resorted to without departing from the spirit or sacrificing any of the advantages of the invention.

In the accompanying drawings which form a part of this specification it will be seen that:

Figure 1, is a side elevation of the novel device embodying my invention, showing it at rest with the retaining-spring tension released, and Fig. 2, is a plan view of the mechanism shown in Fig. 1.

Similar numerals of reference are employed to designate like or equivalent parts wherever found throughout the several views.

In carrying out my invention, as illustrated it will be seen that the numeral 1 designates the pivot post or base member, to which is pivotally secured in any suitable or desirable manner by a pin or stub shaft 2, a metallic member 3 provided with a tubular upper end portion 4 for the reception and retention of the usual trolley pole and its carried trolley (not shown), said member 3 being provided with depending integral rocker arms 5 and so fitted as to tip freely upon the pin or shaft 2. Each of the arms 5 is provided with a curved rim portion 6, and suitably secured to the lowermost portion of each rim is a strap of sheet steel or other suitable material 7, which extends rearwardly and is fixedly secured to a transversely arranged metallic plate 8, to which plate one end of a series of coiled retaining springs 9 are removably secured; the other end of each of said springs being removably fastened to a transversely arranged bar 10, and secured to the bar 10 in any suitable manner and extending rearwardly therefrom is a rod or bar 11, which passes through a guideway 12 formed integral with the rear end portion of a metallic reach arm 13, the front end of said arm being fixedly secured in any desirable manner to the upright post or base member 1. Secured to the threaded outer end portion of the rod or bar 11, by a securing nut 14, is an upwardly and forwardly curved bar 15, which extends forwardly, passing through a plurality of guideways formed by the upright metallic plates or bars 16, and 17 secured to and mounted on the reach arm 13, said bar 15 terminating in advance of the guideway formed by the plates or bars 17, and formed on the upper surface of the bar 15, is a plurality of teeth or notches for the purpose hereinafter described. Pivotally secured to the upper portion of the plates or bars 17, by a pin 19 passing therethrough, is a latch member 20, provided with a depending integral catch 21 and an integral forward extension 21', said catch being adapted to engage with the teeth 18, 18' and 18'' formed on the forward upper surface of the bar 15, and pivotally secured to the rear portion of the reach arm 13 is a metallic loop member constituting what may be properly termed a lever 22, to which is pivotally secured by a pin 23 passing therethrough, a latch 24 adapted to engage with the teeth 25, 25' and 25'' in the upper surface of the bar 15, said lever 22, when in the position shown, being held under the tension of the coiled springs 26, one end of each spring being secured to a pin 27 carried by the lever, and the other end being fastened to a plate 28 fixedly secured to the reach arm 13. Pivotally secured to each side of the metallic member 3 by a pin 29 passing therethrough is a bar 30, each of said bars extending rearwardly beyond the lever 22, and provided with a reduced end portion 31 which is adapted to rest upon and slidingly engage with a pin 32 passing through said lever 22 and secured thereto. To one side of the bar 15 is secured by suitable pins 33 passing through downwardly and rearwardly inclined slots 34, a slidable guard plate 35 terminating at its forward end portion with an upright extension 36.

It will be seen that the device is shown at rest with the spring tension released, and the latch 24 in engagement with the first tooth 25 attached to the sliding bar 15. The bars 30 are so constructed and connected with the trolley pole support 3 that the rear portion of each bar may freely slide backward and forward on the pin 32 carried by the lever 22. The base retaining springs 9 require an extension or expansion of approximately three and one-half inches to obtain the proper pressure of the trolley wheel against the feed wire at all times, and the operation for obtaining the required pressure is as follows:—

By pulling down the trolley pole, the bars 30 will force back the lever 22, and the latch 24 will pull the sliding bar 15 rearwardly until the catch 21 engages with the first tooth 18. By letting the pole rise again, the latch 24 will move forward and engage with the tooth 25', and the pulling down of the pole will permit the catch 21 to engage with the teeth 18', then letting the pole up again the latch 24 will engage with the tooth 25'', and the pulling down of the pole will cause the catch 21 to drop in front of the sliding bar 15 with the spring tension fully restored, then, when the pole rises with the trolley in contact with the trolley wire, the bars 30 will slide forward on the pin 32, the springs 26 will force the lever 22 and latch 24 forwardly thereby causing the outer front end of said latch to engage with the upright extension 36 formed on the guard plate 35 and force the said plate upwardly and forwardly thus raising it at a sufficient height to prevent the latch 24 from engaging with any of the teeth when the bar 15 is released at its forward end by the trolley leaving the wire.

It will be readily perceived that when the trolley is caused for any reason to jump from or leave the trolley wire, the sector 37 will immediately move upwardly and lift the catch 21 from in front of the bar 15, thus causing said bar to move forward and the pole to drop, which action will cause the latch 24 to be moved rearwardly and in its rearward movement will engage the upright 37 fixedly secured to the guard plate and cause the said guard plate to assume the position shown below the teeth formed on the bar 15.

From the foregoing description it is believed that the construction and operation of my novel device will be fully understood by those skilled in the art to which this invention relates.

Having thus described my invention, what I claim and desire to secure by Letters Patent is:

1. A device of the character described, comprising a base member, a trolley pole pivoted to said member provided with rocker arms at its lower end, a plurality of retaining springs secured at one end of the rocker arms, a movable rod or bar connected to the other end of said springs, a slidable toothed bar connected to said movable rod or bar, and means for causing a step by step rearward movement of the slidable toothed bar.

2. A device of the character described, comprising a base member, a trolley pole pivoted to said member provided with rocker arms at its lower end, a plurality of pole retaining springs secured at one end to the rocker arms, a movable rod connected to the other end of said springs, a reach arm fixedly secured to the base member, a slidable toothed bar secured to the outer end of the movable rod, and means secured to said reach arm and pole for causing a step by step rearward movement of the slidable toothed bar for restoring the proper tension to said springs.

3. A device of the character described, comprising a base member, a trolley pole pivoted to said base member having rocker arms at its lower end, pole retaining springs secured to said rocker arms, a reach arm fixedly secured to the base member, a lever pivotally secured to the reach arm with a latch member pivoted thereto, a slidable toothed bar, and means pivotally secured to the trolley pole adapted to slidingly engage said lever and cause a step by step rearward movement of the slidable toothed bar.

4. A device of the character described, comprising a base member, a trolley pole pivoted to said base member having rocker arms at its lower end, pole retaining springs secured to the rocker arms, a reach arm secured to the base member, a slidable toothed bar positioned above the reach arm, means secured to the reach arm and pole whereby an up and down movement of the pole imparts a step by step rearward movement of said toothed bar, and means carried by the reach arm for locking the toothed bar in its rearward position.

5. A device of the character described, comprising a base member, a trolley pole pivoted to the base member, pole retaining springs secured at one end to the lowermost portion of the pole, a movable rod secured to the other end of said springs, a slidable toothed bar secured to the outer end of the movable rod, a reach arm fixedly secured to the base member, and means pivotally secured to the base member and trolley pole to cause a slidable rearward step by step movement of the said toothed bar for restoring the proper tension to said springs.

6. A device of the character described, comprising a base member, a trolley pole pivotally secured to said base member, pole retaining springs secured to the lower end of said pole, a reach arm fixedly secured to the base member, a lever pivoted to the reach arm, springs secured to the reach arm and to said lever, a latch member pivoted to the lever, a slidable toothed bar positioned above the reach arm, means pivotally secured to the said pole adapted to slidingly engage said lever and impart a step by step rearward movement to the toothed bar by the up and down movement of the pole, and means for locking said toothed bar in the rearward position.

7. A device of the character described, comprising a base member, a trolley pole pivotally secured to the base member, pole-retaining springs secured to the pole at one end, and the other end to the springs connected to a movable ratchet bar actuated by the pole to restore the tension to the springs after said spring tension has been released.

8. A device of the character described, comprising a base member, a trolley pole pivotally secured to the base member, pole-retaining springs secured to the pole, a slidable toothed bar, a reach arm secured to the base member, a lever pivoted to the reach arm, springs secured to the reach arm and to said lever, a pivoted latch member carried by said lever, a pivoted catch member carried by the reach arm adapted to lock the toothed bar in its rearmost position, means pivotally secured to the pole adapted to slidably engage with the lever and cause a step by step rearward movement of the toothed bar by the up and down movement of the pole for restoring proper tension to the retaining springs, and means for unlocking the catch member by the swinging movement of the pole.

ALBERT W. HAM.